US012196231B2

(12) United States Patent
Schweizer et al.

(10) Patent No.: US 12,196,231 B2
(45) Date of Patent: Jan. 14, 2025

(54) METHOD FOR COMMISSIONING A PNEUMATIC ACTUATOR DEVICE, COMMISSIONING SYSTEM AND CONTROL MODULE

(71) Applicant: Festo SE & Co. KG, Esslingen (DE)

(72) Inventors: Christian Schweizer, Filderstadt (DE); Tobias Dietrich, St. Johann (DE); Heiko Haase, Kirchheim/Teck (DE); Manuel Wurst, Esslingen (DE); Alexander Meyer, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 368 days.

(21) Appl. No.: 17/517,233

(22) Filed: Nov. 2, 2021

(65) Prior Publication Data

US 2022/0145910 A1 May 12, 2022

(30) Foreign Application Priority Data

Nov. 6, 2020 (DE) ........................ 102020213982.2

(51) Int. Cl.

*F15B 13/08* (2006.01)
*F15B 21/08* (2006.01)
*F15B 19/00* (2006.01)

(52) U.S. Cl.

CPC ........ *F15B 13/0864* (2013.01); *F15B 13/085* (2013.01); *F15B 13/086* (2013.01); (Continued)

(58) Field of Classification Search

CPC .. F15B 13/0864; F15B 13/085; F15B 13/086; F15B 13/0889; F15B 21/085; F15B 21/082; F15B 2211/6303; F15B 2211/30575; F15B 2211/6306; F15B 2211/6309; F15B 2211/6313; F15B 2211/634; F15B 2211/6343; F15B 2211/6656; F15B 19/00; F15B 19/005

(Continued)

(56) References Cited

U.S. PATENT DOCUMENTS 4,150,686 A * 4/1979 El Sherif ............. F15B 15/202 137/557
5,458,048 A * 10/1995 Hohner .............. F15B 13/0814 137/884

(Continued)

FOREIGN PATENT DOCUMENTS

EP 1586780 B1 10/2005
WO 94/04831 A1 3/1994

*Primary Examiner* — Minh Q Le
(74) *Attorney, Agent, or Firm* — Hoffmann & Baron, LLP

(57) ABSTRACT

A method for commissioning a pneumatic actuator device, which includes a pneumatic drive cylinder and a pneumatic control module mounted on the pneumatic drive cylinder, wherein a plurality of commissioning steps to be carried out for commissioning are displayed by means of a graphical display device separate from the control module, the graphical display device in particular being a tablet computer or a mobile telephone, and wherein a control module state is being transmitted from the control module to the display device via a communication link between the control module and the display device, and the commissioning steps are being displayed taking into account the transmitted control module state.

12 Claims, 3 Drawing Sheets

(52) U.S. Cl.
CPC ........ *F15B 13/0889* (2013.01); *F15B 21/085* (2013.01); *F15B 19/00* (2013.01); *F15B 19/005* (2013.01); *F15B 21/082* (2013.01); *F15B 2211/30575* (2013.01); *F15B 2211/6303* (2013.01); *F15B 2211/6306* (2013.01); *F15B 2211/6309* (2013.01); *F15B 2211/6313* (2013.01); *F15B 2211/634* (2013.01); *F15B 2211/6343* (2013.01); *F15B 2211/6656* (2013.01)

(58) Field of Classification Search
USPC ........................................................ 137/487.5
See application file for complete search history.

(56) References Cited

U.S. PATENT DOCUMENTS

| | | | | |
|---|---|---|---|---|
| 2005/0240807 | A1* | 10/2005 | Gebauer | F15B 21/048 714/6.1 |
| 2008/0236683 | A1* | 10/2008 | Arbter | F16K 27/003 137/561 R |
| 2009/0045361 | A1* | 2/2009 | Nolle | F15B 13/086 251/12 |
| 2010/0212305 | A1* | 8/2010 | Runesson | B25J 19/0012 60/459 |
| 2014/0069509 | A1* | 3/2014 | Klicka | G05D 7/0617 137/487.5 |
| 2017/0350427 | A1* | 12/2017 | Leinonen | F15B 19/007 |
| 2018/0245608 | A1* | 8/2018 | Doll | F16K 31/42 |
| 2018/0340554 | A1* | 11/2018 | Hutchison | B64C 13/42 |
| 2019/0078592 | A1* | 3/2019 | Schiesser | F15B 11/064 |
| 2019/0120264 | A1* | 4/2019 | Doll | F15B 11/06 |
| 2019/0136880 | A1* | 5/2019 | Neumann | F15B 15/2838 |
| 2020/0309167 | A1* | 10/2020 | Klassen | F15B 21/087 |

* cited by examiner

METHOD FOR COMMISSIONING A PNEUMATIC ACTUATOR DEVICE, COMMISSIONING SYSTEM AND CONTROL MODULE

BACKGROUND OF THE INVENTION

The invention relates to a method for commissioning a pneumatic actuator device comprising a pneumatic drive cylinder and a pneumatic control module mounted on the pneumatic drive cylinder, wherein a plurality of commissioning steps to be performed for commissioning are displayed by means of a graphical display device separate from the control module, wherein the graphical display device is in particular a tablet computer or a mobile phone. Commissioning the pneumatic actuator device can also be referred to as putting the pneumatic actuator device into service or as starting up the pneumatic actuator device.

SUMMARY OF THE INVENTION

It is an object of the invention to simplify the commissioning of the pneumatic actuator device.

The object is solved by a method in which a control module state is transmitted from the control module to the display device via a communication link between the control module and the display device, and the display of the commissioning steps takes place taking into account the transmitted control module state. In this way, it can be achieved that the commissioning step currently displayed on the display device corresponds to the current control module state. This makes it easier for the user to perform the commissioning step. In particular, this can reduce the risk of the user being shown a commissioning step by the display device that does not match the current (actual) state of the control module.

The invention further relates to a commissioning system comprising a pneumatic actuator device comprising a pneumatic drive cylinder and a pneumatic control module mounted on the pneumatic drive cylinder, and a graphical display device separate from the control module, wherein the graphical display device is in particular a tablet computer or a mobile phone, and the graphical display device is configured to display a plurality of commissioning steps to be performed for commissioning the actuator device, the commissioning system further having a communication link between the control module and the display device, and the control module being configured to transmit a control module state of the control module to the display device via the communication link, and the display device being configured to display the commissioning steps taking into account the transmitted control module state.

Preferably, the commissioning system is configured in correspondence with an embodiment of a method described herein.

The invention further relates to a control module for attachment to a pneumatic drive cylinder, the control module comprising a valve device for providing compressed air for actuating the drive cylinder and a control unit having an open-loop control model and/or a closed-loop control model and being configured to control the valve device in accordance with the open-loop control model and/or the closed-loop control model to effect the provision of the compressed air.

Preferably, the control module is the control module used in the described method and/or in the described commissioning system.

BRIEF DESCRIPTION OF THE DRAWINGS

Further exemplary details as well as exemplary embodiments are explained below with reference to the figures. Thereby shows FIG. 1 a schematic representation of a commissioning system, FIG. 2 a perspective view of an actuator device and FIG. 3 the actuator device with components removed from each other.

DETAILED DESCRIPTION

Figure 1:
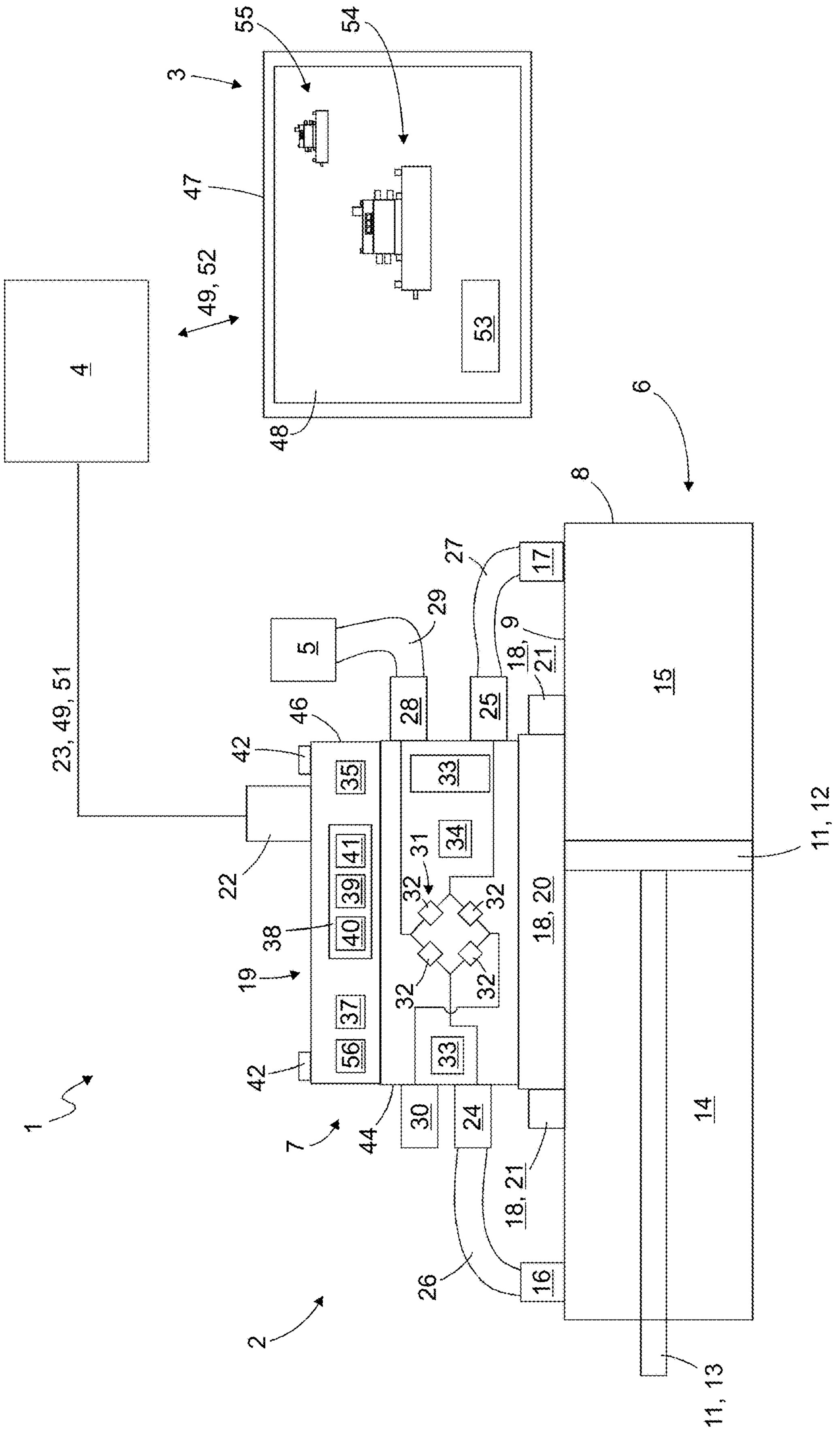

FIG. 1 shows a commissioning system 1 comprising a pneumatic actuator device 2 and a graphical display device 3 separate from the actuator device 2, wherein the graphical display device 3 is in particular a mobile device. The graphical display device 3 is, for example, a tablet computer or a mobile phone. Exemplarily, the commissioning system 1 further comprises a higher-level controller 4, for example a programmable logic controller, PLC, and a compressed air source 5. The actuator device 2 comprises a pneumatic drive cylinder 6 and a pneumatic control module 7 mounted on the pneumatic drive cylinder 6.

The commissioning system 1 is used to commission the pneumatic actuator device 2, in particular to assist the user in connecting the control module 7 communicatively with the higher-level control 4 and/or to connect the control module 7 pneumatically with the drive cylinder 6 and/or the compressed air source 5. FIG. 1 shows the commissioning system 1 in a state in which these connections have already been made and the commissioning has already been completed to that extent.

After commissioning, the pneumatic actuator device 2 can be used in an industrial application, in particular in industrial automation. The display device 3 can then continue to be used together with the actuator device 2, for example to control or monitor it. Furthermore, it is possible to remove the display device 3 after commissioning and to use it, for example, for commissioning another pneumatic actuator device.

Figure 2:
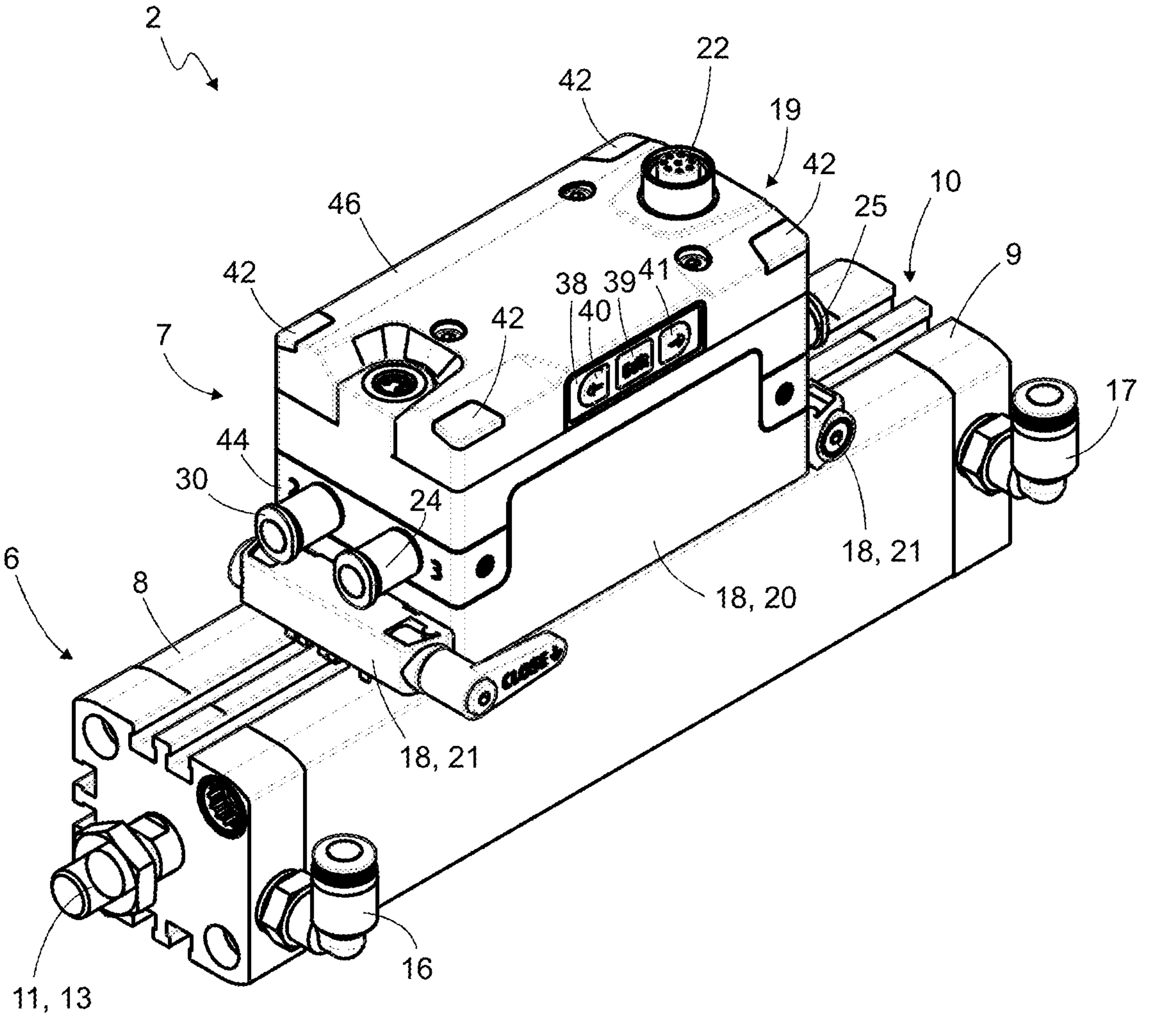
Figure 3:
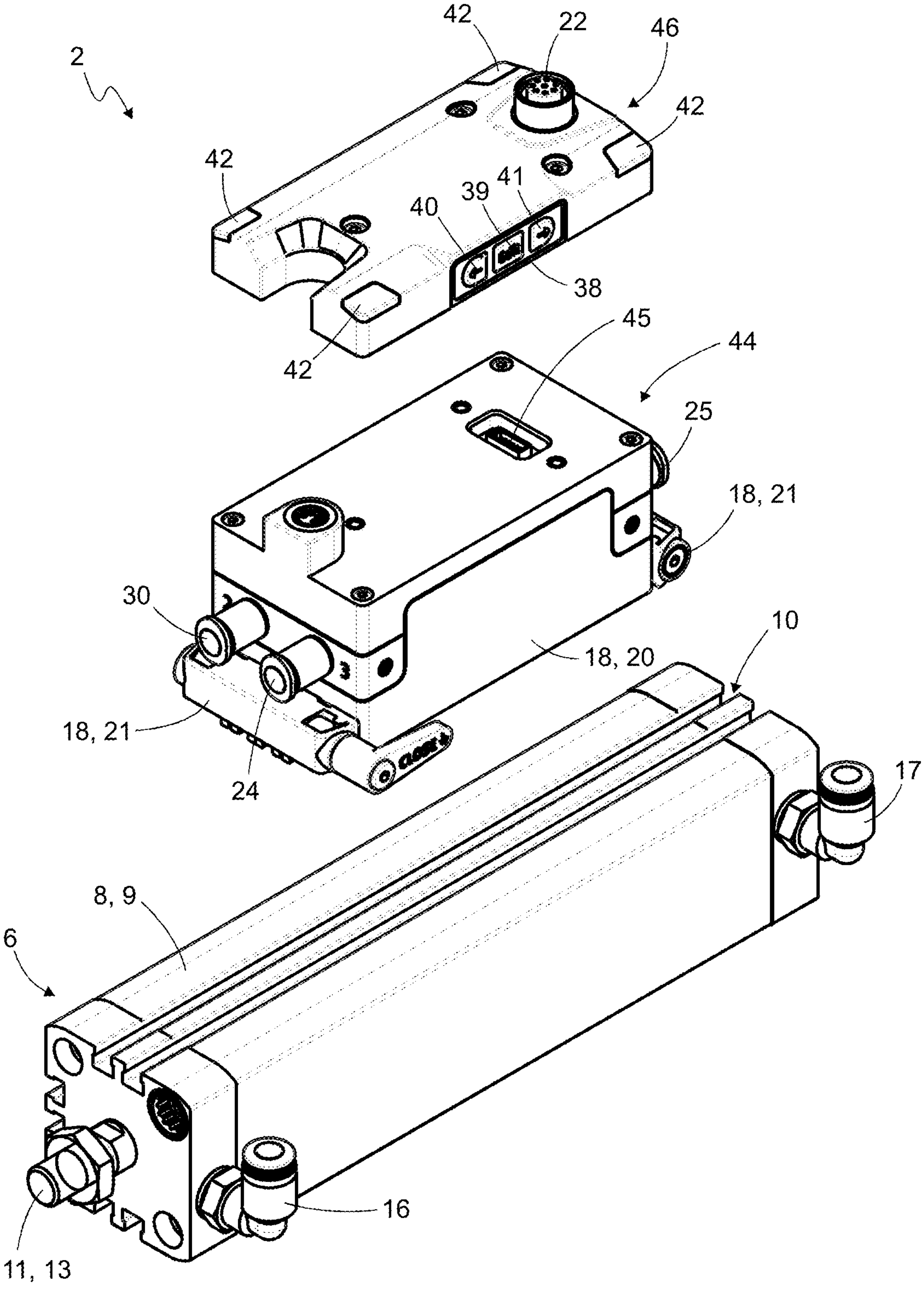

The drive cylinder 6 has a cylinder body 8, which is in particular elongated. On an outer side 9, in particular a longitudinal side, of the cylinder body 8 there is a groove arrangement 10 (shown in FIGS. 2 and 3) to which the control module 7 is attached. The drive cylinder 6 comprises a piston arrangement 11 with a piston 12 and a piston rod 13. The piston 12 divides an inner space of the cylinder body 8 into a first pressure chamber 14 and a second pressure chamber 15. The drive cylinder 6 comprises a first drive cylinder hose port 16, which is pneumatically connected to the first pressure chamber 14, and a second drive cylinder hose port 17, which is pneumatically connected to the second pressure chamber 15.

In an exemplary embodiment, the control module 7 has a cuboidal basic shape. The control module 7 has a main section 19 and a fastening section 18 with which the control module 7 is fastened to the drive cylinder 6, in particular to the groove arrangement 10. The fastening section 18 has a receiving section 20, which is in particular box-shaped. The main section 19 is attached to the receiving section 20, in particular inserted therein. The fastening section 18 further has two fastening devices 21, which are in particular designed as clamping devices and serve to fasten the fastening section 18 to the groove arrangement 10. The fastening devices 21 are arranged in front of and behind the receiving section 20 in the longitudinal direction of the drive cylinder 6. The fastening devices 21 each comprise clamping projections inserted in the groove arrangement 10, and a clamping mechanism by means of which the clamping projections can be moved relative to one another in order to fixedly clamp the clamping projections in the groove arrangement 10.

The control module 7 has a communication port 22 to which a communication cable 23 is connected, via which the control module 7 is communicatively connected to the higher-level controller 4.

The control module 7 further includes a first hose port 24, which is a first pneumatic working output of the control module 7, and a second hose port 25, which is a second pneumatic working output of the control module 7. The first hose port 24 is pneumatically connected to the first drive cylinder hose port 16 via a first hose 26. The second hose port 25 is pneumatically connected to the second drive element hose port 17 via a second hose 27.

The control module 7 further includes a third hose port 28, which serves as a compressed air supply input of the control module 7. The third hose port 28 is pneumatically connected to the compressed air source 5 via a third hose 29.

The control module 7 further comprises a compressed air outlet 30 which is used for discharging compressed air, in particular into the atmosphere. The compressed air outlet 30 represents a compressed air sink.

The control module 7 comprises a valve device 31. The valve device 31 is used to provide compressed air, in particular at the first hose port 24 and the second hose port 25, to actuate the drive cylinder 6. The valve device 31 receives the compressed air from the third hose port 28, and can discharge compressed air via the compressed air outlet 30. The valve device 31 can selectively aerate, de-aerate and/or block the first hose port 24 and the second hose port 25, each independently. Exemplarily, the valve device 31 comprises four 2/2-way valves 32 connected as a full bridge. The 2/2-way valves 32 are preferably pilot-controlled, in particular with piezo valves.

In an exemplary manner, the control module 7 comprises a pressure sensor arrangement 33 for measuring the pressure at the first hose port 24, the second hose port 25, the third hose port 28 and/or the compressed air outlet 30. Exemplarily, the control module 7 further comprises a stroke sensor arrangement 34 for measuring the strokes of the valve members of the valve device 31, in particular of the 2/2-way valves 32. Preferably, the control module 7 comprises an acceleration sensor 35 which is used in particular to detect the orientation of the control module 7 in space—in particular relative to gravity.

The control module 7 comprises an operating device 38 which, by way of example, has a plurality of operating elements, in particular operating keys. The operating elements comprise in particular a first operating key 39, which may also be referred to as a confirmation key. The operating elements further comprise, in an exemplary manner, a second operating key 40, by means of which, for example, an extension of the piston rod 13 can be effected, and/or a third operating key 41, by means of which, for example, a retraction of the piston rod 13 can be effected.

The control module 7 comprises an LED arrangement 42, exemplarily comprising a plurality of LEDs. The LEDs are arranged on the outside of the control module 7—exemplarily on its upper side. In particular, the LEDs are arranged at the upper corners of the control module 7.

The control module 7 comprises a control unit 37, for example a microcontroller, which has an open-loop control model and/or a closed-loop model and is configured to control the valve device 31 in accordance with the open-loop control model and/or the closed-loop control model in order to effect the provision of the compressed air, in particular at the first hose port 24 and/or the second hose port 25. The control unit 37 is communicatively connected to the valve device 31, the pressure sensor arrangement 33, the stroke sensor arrangement 34, the acceleration sensor 35, the operating device 38, an environmental sensor arrangement 56 and/or the communication port 22.

Exemplarily, the control module 7 is of modular construction. The control module 7 comprises a pneumatic sub-module 44 comprising the valve device 31. Exemplarily, the pneumatic sub-module 44 further comprises the pressure sensor arrangement 33, the stroke sensor arrangement 34, the first hose port 24, the second hose port 25, the third hose port 28 and/or the compressed air outlet 30. The pneumatic sub-module 44 is attached to the fastening section 18, in particular with its underside. The pneumatic sub-module 44 has its lower side facing the drive cylinder 6. Exemplarily, the pneumatic sub-module 44 has a cuboidal basic shape. The pneumatic sub-module 44 comprises a communication interface 45 (shown in FIG. 3), which is arranged on the upper side of the pneumatic sub-module 44 and serves to provide a communication link with a control sub-module 46.

The control module 7 further comprises the control sub-module 46, which is detachable from the pneumatic sub-module 44 and comprises the control unit 37. Exemplarily, the control sub-module 46 further comprises the acceleration sensor 35, the operating device 38, the LED arrangement 42, and/or the communication port 22. Exemplarily, the control sub-module 46 is plate-shaped and is attached to the upper side of the pneumatic sub-module 44. The control sub-module 46 may further comprise the environmental sensor arrangement 56, for example comprising a temperature sensor and/or a humidity sensor.

The pneumatic sub-module 44 and the control sub-module 46 together form a cuboid body. In particular, the pneumatic sub-module 44 and the control sub-module 46 together form the main section 19.

Optionally, the control sub-module 46 is configured to provide an auxiliary function, in particular a monitoring function, in a state removed from the pneumatic sub-module 44. The control sub-module 46 can thus preferably also be used without the pneumatic sub-module 44. The auxiliary function, in particular the monitoring function, is performed, for example, using the acceleration sensor 35 and/or the environmental sensor arrangement 56.

The display device 3 is separate from the control module 7. In particular, the display device 3 is offset and/or remote from the control module 7, in particular from the actuator device 2. In particular, the display device 3 is a stand-alone device. In an exemplary embodiment, the display device 3 comprises a device housing 47 and a graphical display 48 arranged in particular on the outside of the device housing 47. The graphical display 48 is a pixel display having a plurality of pixels. For example, the graphical display 48 is a touch screen. In particular, the graphical display 48 comprises an LCD display or an OLED display.

The commissioning system 1 further comprises a communication link 49 between the control module 7 and the display device 3. In an exemplary embodiment, the communication link 49 runs through the higher-level controller 4 and suitably comprises a first connection section 51 between the control module 7 and the higher-level controller 4 and a second connection section 52 between the higher-level controller 4 and the display device 3. The first connection section 51 is in particular wired and is for example provided by a bus, in particular a field bus. The bus is for example Ethernet based. The communication cable 23 is in particular part of the bus. The second connection section 52 is in particular wireless. Alternatively, the second connection section 52 may be wired.

Furthermore, it is possible that the display device 3 is directly connected to the control module 7; that is, that the communication link runs directly from the display device 3 to the control module 7. The communication link may be wired or wireless.

The control module 7 is configured to transmit a control module state of the control module 7 to the display device 3 via the communication link 49. The display device 3 is configured to display a plurality of commissioning steps to be performed for commissioning the actuator device. The display device 3 is further configured to display the commissioning steps taking into account the transmitted control module state.

The display device 3 displays the commissioning steps, in particular sequentially. Preferably, the display device 3 is configured to switch from a currently displayed commissioning step to a next commissioning step in response to a received control module state and to display this (next) step.

The display device 3 displays each commissioning step, for example by means of a text message 53 and/or a graphic 54, in particular a graphic representation of the actuator device 2, in particular on the display 48. The graphic 54 may in particular comprise an animation of the actuator device 2. In particular, the display device 3 indicates to the user, for each commissioning step, what the user should do in the respective commissioning step.

In the following, an exemplary method for commissioning the actuator device 2 using the display device 3 will be explained. In the method, a plurality of commissioning steps to be performed for commissioning are displayed by means of the graphical display device 3 separate from the control module 7, wherein the graphical display device 3 is in particular a tablet computer or a mobile telephone, and the control module state is transmitted from the control module 7 to the display device 3 via the communication link 49 between the control module 7 and the display device 3, and the display of the commissioning steps is performed taking into account the transmitted control module state.

The method starts in a state in which the control module 7 is not yet pneumatically connected to the drive cylinder 6 and/or is not yet communicatively connected to the higher-level controller 4 and/or the display device 3. Further, the method may start in a state in which the control module 7 is not yet attached to the drive cylinder 6.

If the control module 7 is not already attached to the drive cylinder 6, the control module 7 is being attached to the drive cylinder 6, in particular by means of the fastening section 18.

Expediently, the drive cylinder 6 is further being identified, in particular by means of the display device 3. For example, the identification is performed by a manual user input, in particular by means of the display device 3. Further, the identification may be performed by retrieving an identification information, in particular from the cloud, in particular by means of the display device 3. Further, the display device 3 may have an image sensor and may detect with the image sensor a code, in particular a QR code, arranged on the drive cylinder 6, by means of which the drive cylinder 6 is identified. Based on the identified drive cylinder 6, a graphical representation of the drive cylinder 6 on the display device 3 may be adapted and/or a commissioning procedure to be displayed on the display device 3 may be selected. In particular, the type of the pneumatic actuator device 2 is detected, for example by means of the identification information, and a graphical representation of the pneumatic actuator device 2 is displayed on the display device 3 based on the detected type. In particular, the commissioning procedure shall be referred to as the entirety of commissioning steps displayed on the display device 3 within the commissioning procedure.

Preferably, in a state in which there is not yet a communication link to the control module 7, the display device 3 displays a commissioning step relating to connecting the communication cable 23 to the control module 7. This commissioning step shall also be referred to as the cable connection step. For example, the displayed cable connection step prompts the user to connect the communication cable 23 to the communication port 22 by means of a corresponding text message 53 and/or a graphic 54. For example, the graphic 54 shows how to connect a communication cable to a communication port. The user connects the communication cable 23 to the communication port 22, expediently establishing the communication link 49. Preferably, in response to the communication link 49 to the control module 7 being established, the display device 3 automatically switches to a next commissioning step and displays the next commissioning step. Optionally, the LED arrangement 42 indicates, for example by means of an illumination of the LED arrangement 42, that the communication link 49 has been successfully established.

By establishing the communication link 49, the control module 7 is set to a connected state. The connected state represents, for example, a control module state which is transmitted to the display device 3 and on the basis of which the display device 3 displays the commissioning steps, in particular changes to a next commissioning step.

Furthermore, the display device 3 may be adapted to receive control module identification information via the communication link 49, in particular from the control module 7. Based on the control module identification information, the display device 3 may, for example, adapt the commissioning procedure and/or a graphical representation of the control module on the display device 3. In particular, the type of the pneumatic actuator device 2 is detected, for example using the identification information, and a graphical representation 55 of the pneumatic actuator device 2 is displayed on the display device 3 based on the detected type. Optionally, the graphical representation 55 comprises an representation of the LED arrangement 42, which representation lights up and/or changes color in synchronization with the LED arrangement 42.

Preferably, an orientation of the control module 7 in space is detected by means of the acceleration sensor 35 of the control module 7 and the graphical representation 55 of the pneumatic actuator device 2 and/or the control module 7 is displayed on the display device 3 according to the detected orientation. In particular, the orientation of the control module 7 is continuously detected and the graphical representation 55 is continuously updated based on the detected orientation. The display of the graphical representation 55 is expediently performed during commissioning, for example after the communication cable 23 is connected to the communication port 22. The detected orientation of the control module 7 represents another example of a control module state that is transmitted to the display device 3, and based on which the display device 3 adjusts the display of the commissioning steps.

Preferably, at least one of the commissioning steps concerns the connection of a hose 26, 27 to the control module 7 and the drive cylinder 6. A commissioning step concerning the connection of a hose shall also be referred to as a hose connection step. Suitably, the cable connection step is followed by at least one, optionally more, hose connection steps. For example, in response to the control module state that the communication cable 23 is connected, the display device 3 changes from the cable connection step to a hose connection step.

An individual hose connection step can be displayed on the display device 3 for each hose to be connected. Furthermore, a single, common hose connection step can be displayed on the display device 3 for several, in particular all, hoses to be connected.

For example, by means of a corresponding text message 53 and/or graphic 54, each displayed hose connection step prompts the user to connect one or more hoses 26, 27, 29 to the respective associated hose port 24, 25, 28. For example, the graphic 54 shows how to connect one or more hoses 26, 27, 29 to the respective associated hose port 24, 25, 28. For example, for each hose 26, 27, 29, the graphic 54 shows the respective associated hose port 24, 25, 28 to which that hose is to be connected. For example, the graphic 54 indicates that the first hose 26 is to be connected to the first hose port 24 and the first drive cylinder hose port 16, that the second hose 27 is to be connected to the second hose port 25 and the second drive cylinder hose port 17 and/or that the third hose 29 is to be connected to the third hose port 28 and the compressed air source 5.

Preferably, for at least one commissioning step, in particular each hose connection step, a visual indication signal is output by means of at least one LED of the control module 7, in particular an LED of the LED arrangement 42, for a user performing the commissioning. For example, by means of the visual indication signal, a hose port of the pneumatic control module 7 to which the hose is to be connected is indicated. For example, the LED of the LED arrangement 42 located closest to the hose port to which the hose is to be connected is illuminated. Preferably, the visual indication signal is being emitted in parallel, in particular simultaneously, with the displaying of the associated commissioning step, in particular hose connection step, on the display device 3.

The user connects the control module 7 to the drive cylinder 6 and the compressed air source 5 via the hoses 26, 27, 29. Exemplarily, the user connects the first hose 26 to the first hose port 24 and the first drive cylinder hose port 16, the second hose 27 to the second hose port 25 and the second drive cylinder hose port 17, and/or the third hose 29 to the third hose port 28 and the compressed air source 5.

Expediently, the display of the commissioning steps on the display device 3 takes place in consideration of an operation performed with the operating device 38, in particular the confirmation key 39. The operation of the operating device 38 represents an example of a control module state which is transmitted to the display device 3 and on the basis of which the display device 3 displays the commissioning steps. For example, in response to the operation of the operating device 38, the display device 3 changes from a current commissioning step to a next commissioning step and displays it. For example, the user operates the operating device 38 in particular by pressing the confirmation key 39 after completing the one or more hose connection steps. Provided that there is more than one hose connection step, the user can, by actuating the confirmation key 39, respectively switch to the next hose connection step and/or to a further commissioning step following the last hose connection step. If there is only one hose connection step, one can switch to a further commissioning step following the hose connection step by pressing the confirmation key 39.

Preferably, the completion of the one or more hose connection steps is signalled by means of the LED arrangement 42, in particular by means of all LEDs of the LED arrangement 42 lighting up, for example in a first colour, in particular green. Expediently, it is detected by means of the pressure sensor arrangement 33 that compressed air is supplied to the control module 7 and on the basis of this detection a corresponding indication is signalled by means of the LED arrangement 42, for example by a second colour, in particular orange.

Optionally, the commissioning steps further comprise an installation step in which the actuator device 2 is installed in the intended application. The installation step is expediently performed between the hose connection steps, in particular after the hoses 26, 27 have been connected and before the hose 29 is connected. For example, by means of a corresponding text message 53 and/or a graphic 54, the displayed cable connection step prompts the user to install the actuator device 2 into the intended application.

For example, there is a first hose connection step in which the user is prompted by the display device 3 to connect the first hose 26 and the second hose 27 in the manner explained above. In particular, the first hose connection step is terminated by pressing the confirmation key 39. The display device 3 then displays the installation step, which is expediently terminated by actuation of the confirmation key 39. The display device 3 then displays a second hose connection step, in which the user is prompted by the display device 3 to connect the third hose 29 in the manner explained above. In particular, the second hose connection step is terminated by actuation of the confirmation key 39.

Preferably, the display device 3 displays at least one available function of the actuator device 2 and the function is started by operating the display device 3. In particular, the function is displayed after completion of the one or more hose connection steps. For example, the function is displayed as a control field on the display 48 configured as a touch screen and can be started by operating the control field. Preferably, the display device 3 displays a plurality of available functions of the actuator device 2, in particular by means of a plurality of control fields on the touch screen.

The function is, for example, a test drive by which the control module 7 automatically performs a parameterization, in particular of its open-loop control model and/or closed-loop control model. For example, the test drive determines as parameters a friction value, a mass, an end position damping and/or system limits.

The completion of the test drive is expediently signalled by means of the LED arrangement 42, in particular by lighting up in a specific colour, for example the first colour.

Commissioning is now complete. The actuator device 2 is now expediently being used for industrial automation, for example in an industrial plant. The control module 7 performs open-loop and/or closed-loop control of the drive cylinder 6, in particular on the basis of the open-loop control model and/or the closed-loop control model. Exemplarily, the control module 7 receives a control command, for example a set point, from the higher-level controller 4 and performs the open-loop control and/or closed-loop control based on the control command.

The control module 7 may also be referred to as a smart box, and in particular represents a smart sensor/actuator module that may be mechanically attached to a standard component—the drive cylinder—to make the standard component a smart component.

The control module 7 optionally has a data logging function and is particularly adapted to record and store sensor data, for example sensor data from the pressure sensor arrangement 33, the stroke sensor arrangement 34, the acceleration sensor 35 and/or the environmental sensor arrangement 56.

Further, the control module 7 may optionally have a machine learning component, for example an artificial neural network, and be configured to provide a predictive maintenance function using the machine learning component, for example a calculation of a service life and/or a maintenance point in time, in particular based on the sensor data.

Furthermore, the control module may optionally be configured to perform, using the machine learning component, the parameterization, in particular by means of the test drive.

By means of the method for commissioning the actuator device 2, the user and/or commissioner can be guided interactively from the unpacking of the delivered components to a test operation via an assistant—the display device 3. By means of images, animations and/or videos on the display device 3, he receives step-by-step assistance and/or instructions for action by means of the successive commissioning steps. Preferably, the visualization—in particular the display device 3—is coupled to the real actuator device 2, so that status messages, feedback and an indication of connection points can be provided via LEDs of the LED arrangement 42 on the control module 7. In addition to control elements in the visualization—for example control fields on the touch screen of the display device 3—control elements—the control device 38—on the control module 7 can also be used to acknowledge actions—in particular to complete individual commissioning steps.

At the start of commissioning, the user may be assisted in assembling and/or adapting the actuator device 2 by means of offline content.

Once the actuator device 2 is powered, an interactive connection—in particular the communication link 49—can be automatically established to the guidance of the display device 3, so that the commissioning procedure displayed on the display device 3 can respond and/or react to the user's activities.

The display device 3 represents in particular an interactive commissioning assistant. In particular, the communication link 49 provides an active connection between the component to be commissioned—the actuator device 2—and the software (manual, instructions, representation of the graphical representation of the actuator device, dashboard, . . . ) of the display device.

Via the sequential display of the commissioning steps, in particular a guided step-by-step instruction takes place on the display device 3 with interaction to the real hardware—the actuator device 2. In particular, a feedback and possible error detection with respect to the performed commissioning step is possible via the display device 3.

Interaction between the user and the actuator device 2 may take place be via the display device 3 or the control device 38.

Once commissioning has been completed, the available functions of the actuator device 2 can be executed as services and displayed on the display device 3 (e.g. starting a test run, auto-tuning, moving the piston arrangement 11 to a defined end position, intermediate position).

What is claimed is:

1. A method for commissioning a pneumatic actuator device, which comprises a pneumatic drive cylinder and a pneumatic control module mounted on the pneumatic drive cylinder, wherein a plurality of commissioning steps to be carried out for commissioning are being displayed by means of a graphical display device separate from the control module, and a control module state is being transmitted from the control module to the display device via a communication link between the control module and the display device, and the commissioning steps are being displayed taking into account the transmitted control module state, and wherein the commissioning steps are sequentially displayed by means of the display device, and wherein a commissioning step currently displayed by means of the display device is switched to a next commissioning step in response to a received control module state, wherein said next commissioning step is displayed by means of the display device.

2. The method according to claim 1, wherein at least one of the commissioning steps concerns connecting a hose to the control module and the drive cylinder.

3. The method according to claim 1, wherein, for at least one commissioning step, a visual indication signal is output for a user carrying out the commissioning, the visual indication signal being output by means of at least one LED of the control module.

4. The method according to claim 3, wherein, by means of the visual indication signal, a hose port of the pneumatic control module is indicated to which hose port a hose is to be connected.

5. The method according to claim 1, wherein the control module has an operating device and the display of the commissioning steps on the display device takes place taking into account an operation carried out with the operating device.

6. The method according to claim 1, wherein the type of the pneumatic actuator device is being detected and a graphical representation of the pneumatic actuator device is being displayed on the display device based on the detected type.

7. The method according to claim 1, wherein an orientation of the control module in space is being detected by means of an acceleration sensor of the control module and a graphical representation of the pneumatic actuator device and/or the control module is being displayed on the display device according to the detected orientation.

8. The method according to claim 1, wherein the display device displays at least one available function of the actuator device and the function is started by operating the display device.

9. The method according to claim 1, wherein the display device, in a state in which there is not yet a communication link to the control module, indicates a commissioning step concerning the connection of a communication cable to the control module.

10. The method according to claim 9, wherein the display device automatically switches to a next commissioning step in response to the communication link to the control module being established.

11. The method according to claim 1, wherein the display device is a tablet computer or a mobile phone.

12. A commissioning system, comprising a pneumatic actuator device, which comprises a pneumatic drive cylinder and a pneumatic control module mounted on the pneumatic drive cylinder, the commissioning system further comprising a graphical display device separate from the control module, which graphical display device is configured to display a plurality of commissioning steps to be carried out for commissioning the actuator device, wherein the commissioning system further comprises a communication link between the control module and the display device, and the control module is configured to transmit a control module state of the control module to the display device via the communication link, and the display device is configured to display the commissioning steps taking into account the transmitted control module state, and wherein the display device is configured to display the commissioning steps sequentially, and wherein the display device is further configured to switch from a currently displayed commissioning step to a next commissioning step in response to a received control module state and to display this next step.

* * * * *